US012770936B2

(12) United States Patent
Stewart et al.

(10) Patent No.: US 12,770,936 B2
(45) Date of Patent: Oct. 20, 2026

(54) TRIGGER CELL FOR TRIGGERING THERMAL RUNAWAY IN BATTERIES

(71) Applicant: BAE Systems Controls Inc., Endicott, NY (US)

(72) Inventors: Joshua P. Stewart, Vestal, NY (US); Matthew S. Boecke, Endicott, NY (US); Peter J. Arnold, Endicott, NY (US); Jay R. Johnson, Vestal, NY (US); Jamie-Lynn Ganoung, Chenango Forks, NY (US); Thomas E. Yale, Jr., Johnson City, NY (US); Robert J. Arbogast, Binghamton, NY (US); William J. Doak, Nashua, NH (US)

(73) Assignee: BAE Systems Controls Inc., Endicott, NY (US)

( * ) Notice: Subject to any disclaimer, the term of this patent is extended or adjusted under 35 U.S.C. 154(b) by 705 days.

(21) Appl. No.: 18/121,223

(22) Filed: Mar. 14, 2023

(65) Prior Publication Data

US 2024/0313272 A1 Sep. 19, 2024

(51) Int. Cl.
*H01M 10/42* (2006.01)

(52) U.S. Cl.
CPC ............................... *H01M 10/4285* (2013.01)

(58) Field of Classification Search
CPC ............ H01M 10/4285; H01M 10/48; H01M 10/486; Y02E 60/10
See application file for complete search history.

(56) References Cited

U.S. PATENT DOCUMENTS

| | | | | |
|---|---|---|---|---|
| 4,926,106 | A * | 5/1990 | Tanis | H05B 3/58 219/202 |
| 2020/0036068 | A1 | 1/2020 | Recoskie et al. | |
| 2024/0304963 | A1* | 9/2024 | Wu | H01M 50/44 |

OTHER PUBLICATIONS

Darcy, Eric/ NASA-JSC, "Driving Factors for Mitigating Cell Thermal Runaway Propagation and Arresting Flames in High Performing Li-ion Battery Designs," 2015 Electric Aircraft Symposium, May 1-2, 2015. 61 pages.

(Continued)

*Primary Examiner* — John E Breene
*Assistant Examiner* — Manuel Salvador Castellon, Jr.
(74) *Attorney, Agent, or Firm* — Gary McFaline

(57) ABSTRACT

A system for testing thermal runaway in a battery cell includes a first layer of first dielectric material at least in part wrapped around the battery cell, and a wire at least in part wrapped around the first layer of first dielectric material. The system further includes a second layer of second dielectric material at least in part wrapped around the wire, and a power source configured to supply power to the wire. In an example, the first layer of first dielectric material includes a polyimide film, and the second layer of second dielectric material includes mica. The system further includes a temperature sensor in contact with the first layer, the second layer, and/or the battery cell. A controller is to receive a temperature reading from the temperature sensor, and control a power supplied by the power source to the wire, based at least in part on the temperature reading.

17 Claims, 5 Drawing Sheets

(56) References Cited

OTHER PUBLICATIONS

Lao et al., Thermal Runaway Induced Casing Rupture: Formation Mechanism and Effect on Propagation in Cylindrical Lithium Ion Battery Module, Journal of the Electrochemical Society, Apr. 17, 2020, 167(9), 090519, (Retrieval date: May 1, 2024) [Retrieved from the Internet: https://doi.org/10.1149/1945-711 1/ab8807], p. 1-8.
Chen et al., A Simplified Mathematical Model for Heating-Induced Thermal Runaway of Lithium-Ion Batteries, Journal of the Electrochemical Society, Jan. 6, 2021, 168(1), 010502, (Retrieval Date: May 1, 2024) [Retrieved from the internet: https://doi.org/ 10.1149/ 1945-7111/ abd64c], p. 1-13.
Ianello et al., Simplified Aid for Extra-Vehicular Activity Rescue (SAFER) Battery Assessment, Technical Memorandum, Apr. 1, 2018, (Retrieval date: May 3, 2014), [Retrieved from the internet: https://ntrs.nasa.gov/api/citations/20180003204/ downloads/ 20180003204.pdf], p. 1-141.
International Search Report, PCT/US24/19375, mailed May 14, 2024, 12 pages.

* cited by examiner

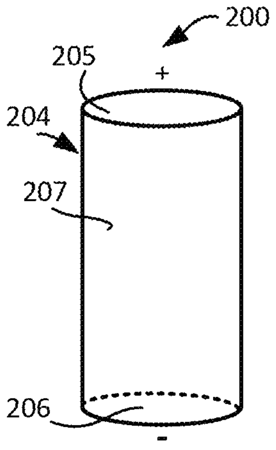
FIG. 2A
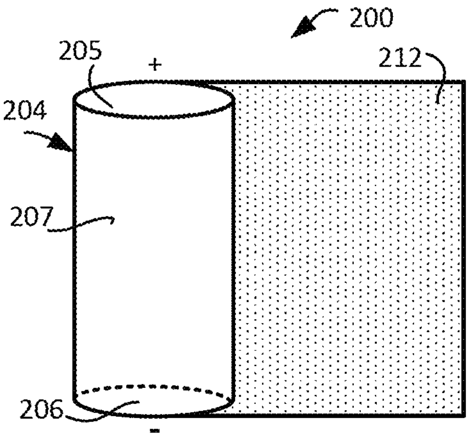
FIG. 2B
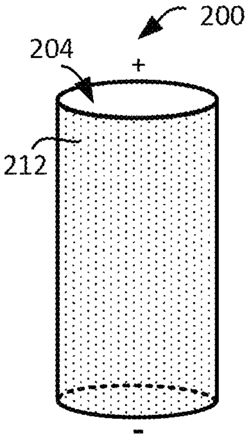
FIG. 2C
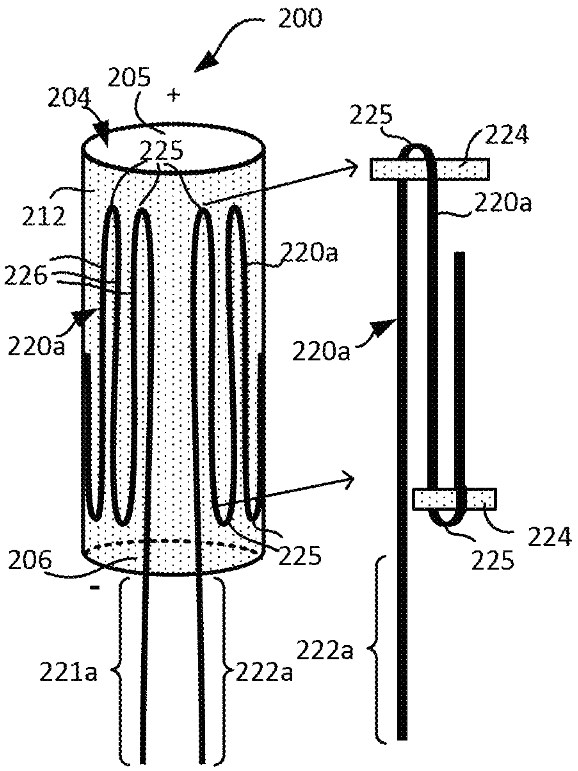
FIG. 2D1
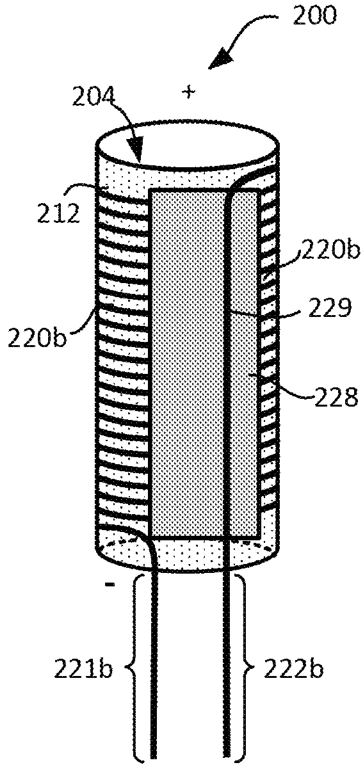
FIG. 2D2

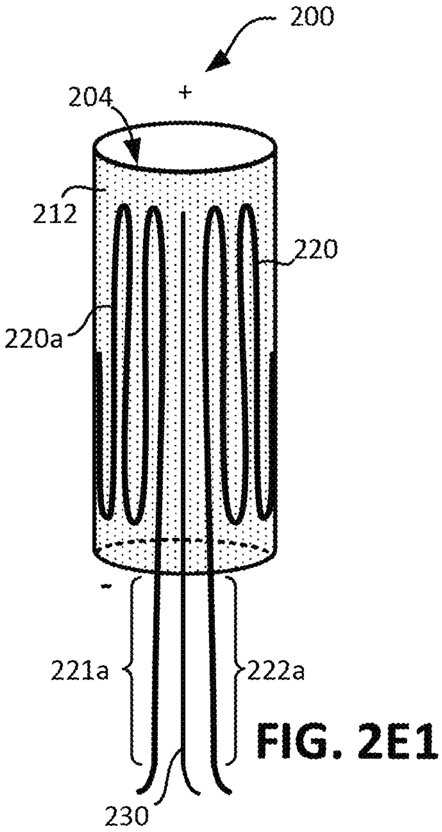
FIG. 2E1
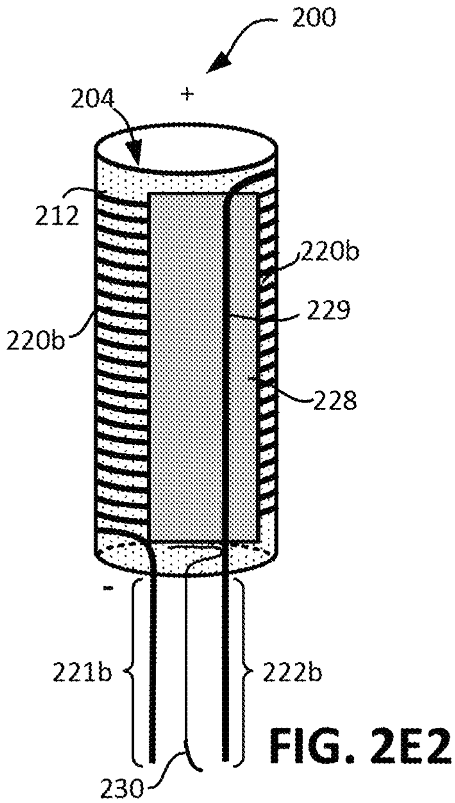
FIG. 2E2
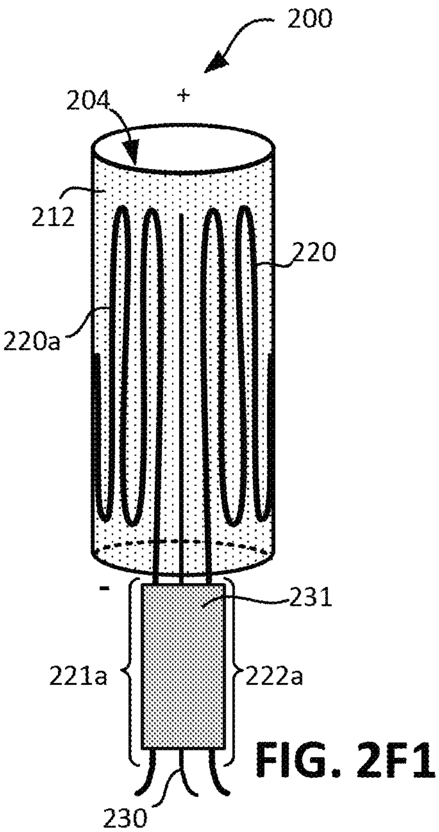
FIG. 2F1
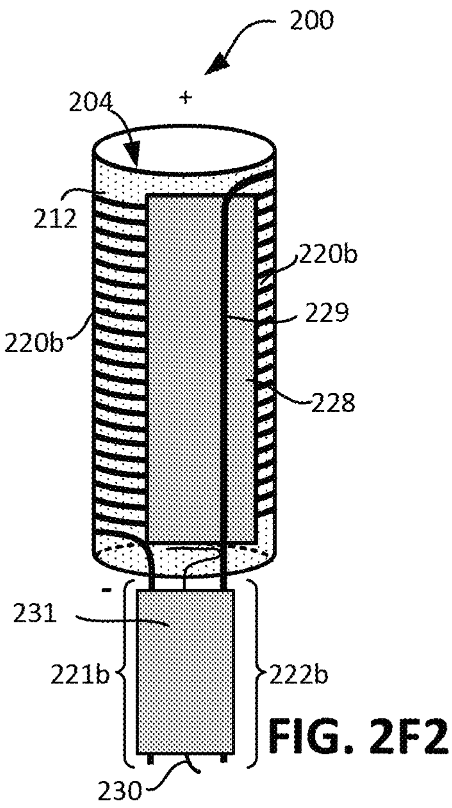
FIG. 2F2

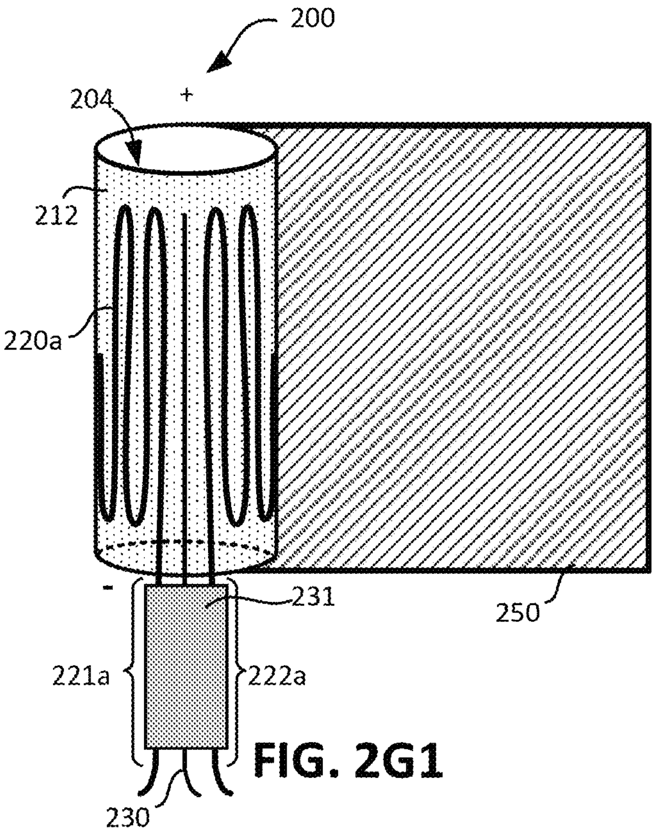
FIG. 2G1
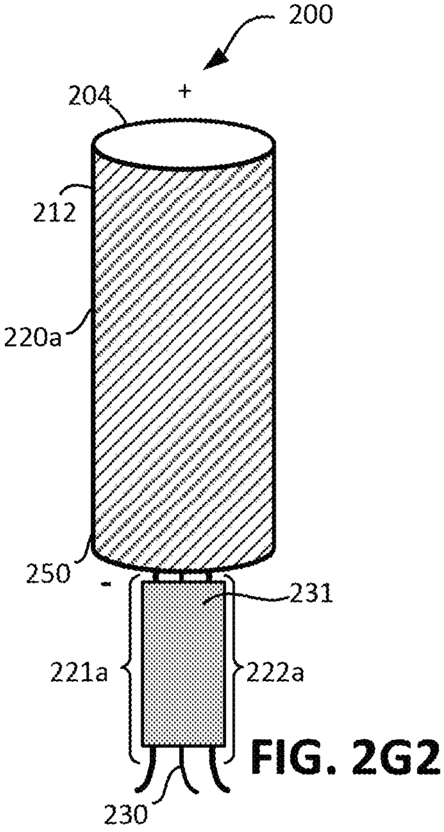
FIG. 2G2
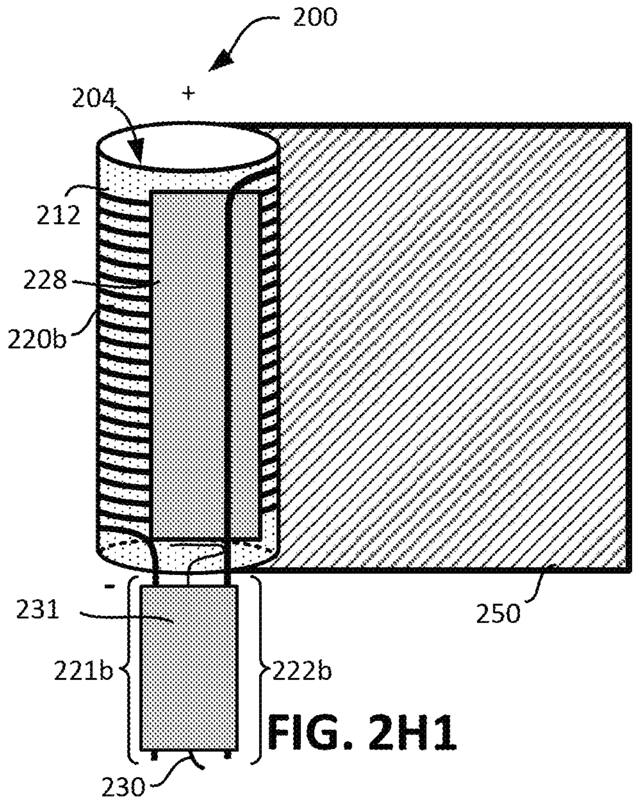
FIG. 2H1
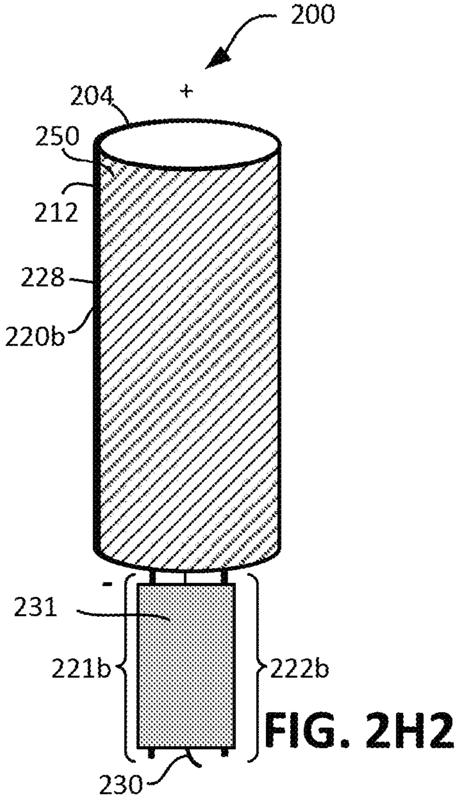
FIG. 2H2

TRIGGER CELL FOR TRIGGERING THERMAL RUNAWAY IN BATTERIES

TECHNICAL FIELD

The present disclosure relates generally to battery technology, and more particularly to techniques for testing thermal runaway in battery packs.

BACKGROUND

A battery is a popular source of electric power, e.g., providing direct current (DC) to a load. A battery has a positive terminal or cathode, and a negative terminal or anode. Multiple batteries can be coupled in series and/or parallel, to form a high voltage and/or high power DC power source.

Rechargeable batteries can be charged and discharged, and such charge and discharge cycles can occur multiple times over a life of a battery. For example, once the battery is discharged while in use, the battery can be recharged using an applied electric current, during which an original composition of the battery electrodes may be fully or at least partially restored by reverse current. Examples of such rechargeable batteries include lead-acid batteries and lithium-ion batteries.

Batteries can be used for any number of applications, such as used in consumer electronic devices, wearable devices, computers, electrical and non-electric vehicles, and/or many other devices or systems that use DC power. There remain several non-trivial issues with respect to operating battery packs.

BRIEF DESCRIPTION OF THE DRAWINGS

FIGS. 2A, 2B, 2C, 2D1, 2D2, 2E1, 2E2, 2F1, 2F2, 2G1, 2G2, 2H1, 2H2, and 2I collectively illustrate a trigger cell in various stages of formation and operation in accordance with the methodology of FIG. 1, in accordance with an embodiment of the present disclosure.

Figure 1:
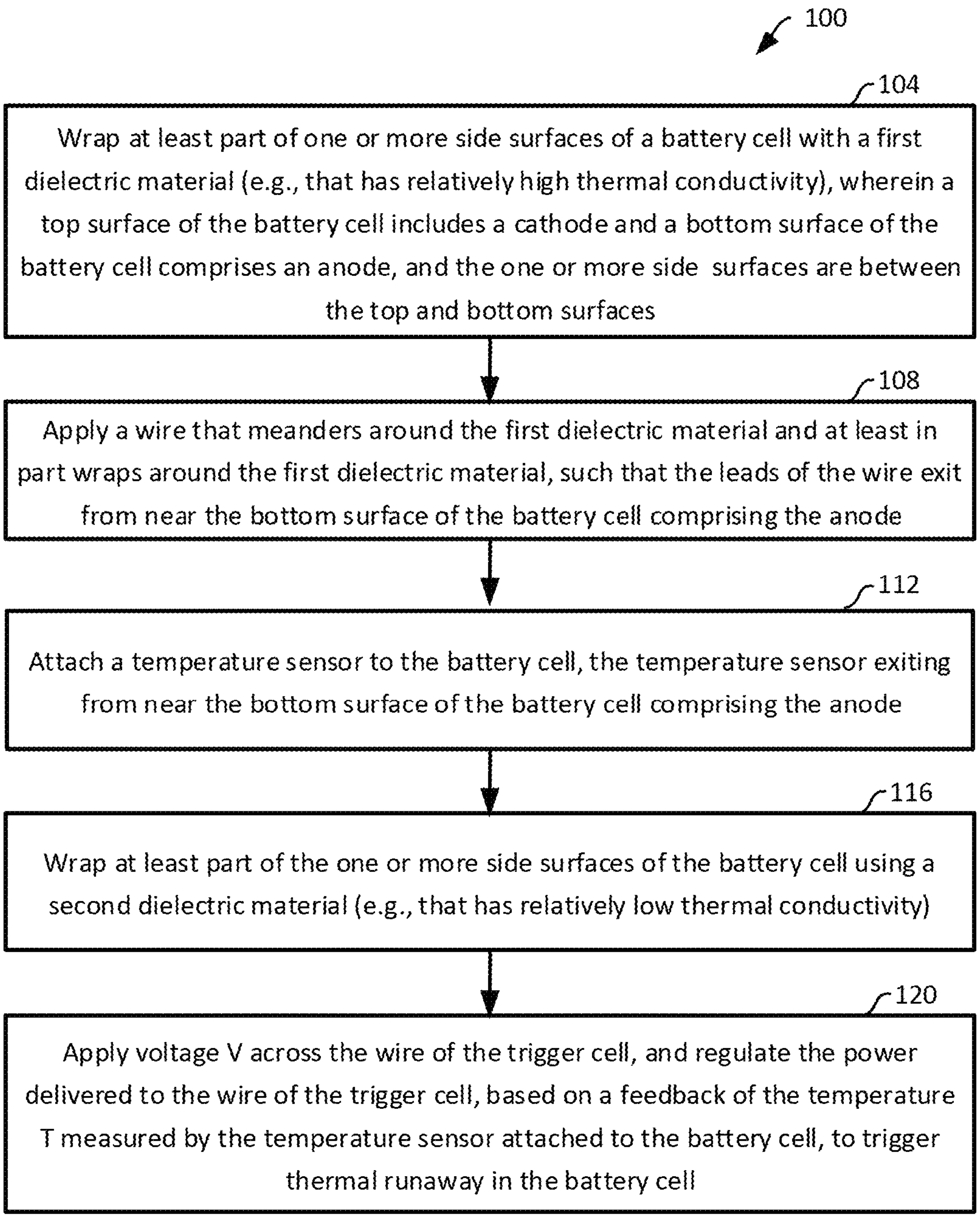
FIG. 1 illustrates a flowchart depicting a method of forming a trigger cell to trigger or cause a thermal runaway in a battery cell, and operating the trigger cell, in accordance with an embodiment of the present disclosure.

The figures depict various embodiments of the present disclosure for purposes of illustration only and are not necessarily drawn to scale. Numerous variations, configurations, and other embodiments will be apparent from the following detailed description.

DETAILED DESCRIPTION

Disclosed are methodologies and systems for forming and operating a trigger cell that can trigger a thermal runaway in a battery cell. Triggering the thermal runaway in the battery cell allows testing of the battery cell during a thermal runaway event. Such testing may include, for example, measuring parameters associated with thermal runaway in the battery cell, and qualifying thermal runaway handling capabilities of the battery cell. The trigger cell may be advantageously used for testing a lithium ion battery cell, although the battery cell under test may be of another type, such as a lead acid battery cell, or a hydrogen cell.

In one embodiment, a system for testing thermal runaway in a battery cell includes a trigger cell, which comprises a first layer of first dielectric material at least in part wrapped around the battery cell, and a wire at least in part wrapped around the first layer of first dielectric material. In an example, the wire includes one or more metals. The wire, for example, is a nichrome wire including an alloy of nickel and chromium. Various example layouts of the wire around the first layer of first dielectric material are described below. The system further includes a second layer of second dielectric material at least in part wrapped around the wire, and a power source configured to supply power to the wire. In an example, the power source is configured to supply the power to the wire, to heat the wire and cause the thermal runaway in the battery cell. In an example, the first layer of first dielectric material includes a polyimide film, and the second layer of second dielectric material includes mica. In an example, the second layer of second dielectric material has a lower thermal conductivity than the first layer of first dielectric material.

In one embodiment, the system further includes a temperature sensor in contact with at least one of the first layer, the second layer, and the battery cell. In some examples, a controller is to receive a temperature reading from the temperature sensor, and control a power supplied by the power source to the wire, based at least in part on the temperature reading. In some such examples, the controller is configured to control the power supplied by the power source to the wire, so as to maintain a constant or near constant rise in the temperature reading. Numerous variations and embodiments will be apparent in light of the present disclosure.

General Overview

As mentioned herein above, there remain several non-trivial issues with respect to operating battery packs, such as lithium-ion battery packs. One challenge of lithium-ion battery technology is thermal management. An ongoing concern is the possibility of thermal runaway during use, handling, and/or transportation of lithium-ion batteries. Thermal runaway occurs when a series of self-sustaining exothermic side-reactions lead to total failure of the cell and, in some cases, fire and/or explosion. A battery cell undergoing a thermal runaway may emit hot gases, flames, and high-velocity jets of molten particulate matter, referred to as ejecta. Lithium-ion batteries have the potential to experience thermal runaway due to the chemical nature of the lithium-ion technology. Although significant progress has been made over time to improve cell performance (e.g., reducing capacity fade, increasing available power, etc.), challenges of thermal runaway and its propagation persist. For example, the materials and construction of individual battery cells or of the battery pack can result in a localized hot spot or heating that results in cell failure. Also, over-constraining a battery cell can result in large pressure gradients that lead to failure of mechanical components, such as plates and fasteners around a battery cell. Similarly, not letting the ejecta escape can lead to instantaneous formation of local hot spots that can trigger thermal runaway in nearby battery cells. Therefore, a need exists for testing battery packs for thermal runaway conditions.

Accordingly, techniques are described herein to form a trigger cell that can trigger or cause thermal runaway in a battery cell. In an example, triggering the thermal runaway in the battery cell allows testing of the battery cell during a thermal runaway event and/or to measure parameters associated with thermal runaway in the battery cell, and allows testing thermal runaway handling capabilities of the battery cell. For example, the trigger cell is built for testing the safety and robustness of the battery cell during the thermal runaway event. The battery cell, for which the thermal runaway triggering mechanism is formed, can be any appropriate type of battery cell, such as a lithium ion battery cell, a lead acid battery cell, or a hydrogen cell.

In an example, the trigger cell includes a first dielectric material wrapped at least in part on one or more side surfaces of the battery cell. For example, for an orientation illustrated in various figures described below, a top surface of the battery cell comprises a cathode and a bottom surface of the battery cell comprises an anode, and the one or more side surfaces (e.g., on which the first dielectric material is wrapped around) extend from the top surface to the bottom surface, e.g., as illustrated in FIG. 2A. In an example, the first dielectric material is wrapped around a side surface of the battery cell using an appropriate adhesive. In an example, the first dielectric material has relatively low electrical conductivity and relatively high thermal conductivity. For example, as described below, a wire is wrapped around the first dielectric material, and low electrical conductivity ensures that adjacent turns of the wire doesn't get electrically shorted by the first dielectric material. In an example, it is intended that the heat generated by the wire reaches the battery cell, e.g., to heat the battery cell and trigger thermal runaway in the battery cell. Accordingly, in an example, the first dielectric material has relatively high thermal conductivity, e.g., to allow the heat from the wire to reach the battery cell, as described below. In an example, the first dielectric material may be able to withstand high temperature, such as at least 300° C., or at least 400° C., or at least 500° C., or at least 600° C., for example, without substantially melting. The high temperature withstanding capability prevents, or at least reduces chances of the dielectric material melting during heating of the battery cell for triggering the thermal runaway. In an example, the first dielectric material is an insulating tape, e.g., a Polyimide film, such as a Kapton® tape.

In one embodiment, a wire is applied on and around the first dielectric material, where the wire meanders around the first dielectric material, and at least in part wraps around the first dielectric material. In an example, the wire is fixed on the first dielectric material using an appropriate adhesive. Various example layouts of the wire are described below. For example, FIG. 2D1 described below illustrates an example first layout of the wire, and FIG. 2D2 described below illustrates an example second layout of the wire.

In an example, the leads or end sections of the wire exit from near the bottom surface of the battery cell comprising the anode. For example, during a faulty operation of a battery cell (such as during thermal runaway or for another reason), gases may be released by the battery cell, referred to herein as "outgassing" of the battery cell. For example, a pressure relief valve or membrane may be on or near a cathode or positive terminal of the battery cell, e.g., on or near the top surface of the battery cell, where the pressure relief valve or membrane may rapture during such an outgassing event, thereby releasing such gases. For example, during the thermal runaway triggered by the trigger cell, an outgassing event may occur. Because of the venting of such gases from or near the top surface of the battery cell, the end sections of the wire exit from or near the bottom surface comprising the negative or anode terminal of the battery cell, as illustrated in FIGS. 2D1 and 2D2, e.g., to avoid or reduce chances of the end sections of the wire coming in contact with the outgases. In one embodiment, the wire comprises relatively high resistivity conductive material, such that the wire can generate sufficient heat to trigger the thermal runaway in the battery cell. Thus, the wire acts as a heating element in the trigger cell. In an example, a nichrome wire may be used, where the nichrome comprises an alloy of, for example, nickel, chromium, and/or one or more other metals.

In one embodiment, a temperature sensor is attached to the trigger cell. In an example, the temperature sensor exits from near the bottom surface of the battery cell comprising the anode, e.g., due to possibilities of outgassing event from the top surface of the battery cell, as described above. In an example, a thermocouple (such as a 30 gauge thermocouple) is used as a temperature sensor, although any other appropriate type of temperature sensor may also be used.

In an example, at least a part of the one or more side surfaces of the battery cell are wrapped using a second dielectric material. Thus, the second dielectric material wraps around the wire, and secures the wire in place. In an example, the second dielectric material has relatively low thermal conductivity. For example, the thermal conductivity of the second dielectric material is less than that of the first dielectric material. The low thermal conductivity of the second dielectric material may ensure that a majority of the heat generated by the wire remains trapped within the second dielectric material, and is transferred to the battery cell through the relatively high thermally conductive first dielectric material, thereby triggering the thermal runaway process. In an example, a pressure sensitive adhesive (PSA) backed dielectric material, such as PSA backed mica, is used for the second dielectric material.

In one embodiment, during operation of the trigger cell, a power source applies a voltage V across the wire of the trigger cell, to generate a current I within the wire. In an example, a controller regulates the power delivered to the wire, e.g., based on a feedback of the temperature T measured by the temperature sensor attached to the battery cell. The power supplied to the wire heats up the wire (e.g., the relatively high resistance wire acts as a heating element), which in turn heats up the battery cell, and triggers thermal runaway in the battery cell. The power source can control the power supplied to the wire of the trigger cell, e.g., by regulating the voltage V and/or the current I applied to the wire of the trigger cell. The controller receives feedback of the temperature T from the temperature sensor, and regulates the power source based on the temperature T. For example, the controller aims to ensure a relatively smooth rise in the temperature T of the battery cell (e.g., constant or near constant temperature slope), and accordingly, regulates the power delivered to the wire. The controller aims to maintain the constant or substantially constant rise in temperature T, e.g., to mimic real life battery cell thermal runaway conditions, where temperature may rise with a constant or substantially constant slope. Once the battery cell is heated to a certain degree, the battery cell starts a self-heating process, which indicates a start of thermal runaway condition. Once the self-heating process starts, the controller reduces power supplied to the wire, and ceases supplying any power once the thermal runaway occurs.

In accordance with some embodiments of the present disclosure, these various approaches can be used individually or together to test a battery cell, by triggering a thermal runaway event in the battery cell. Numerous variations and embodiments will be apparent in light of the present disclosure.

As used herein, the term "about" indicates that the value listed may be somewhat altered or otherwise within an acceptable tolerance, as long as the alteration does not result in nonconformance of the process or device. For example, for some elements the term "about" can refer to a variation of +0.1%, for other elements, the term "about" can refer to a variation of +1% or +10%, or any point therein. As also used herein, terms defined in the singular are intended to include those terms defined in the plural and vice versa.

Reference herein to any numerical range expressly includes each numerical value (including fractional numbers and whole numbers) encompassed by that range. To illustrate, reference herein to a range of "at least 50" or "at least about 50" includes all whole and real numbers of 50 and greater, and reference herein to a range of "less than 50" or "less than about 50" includes all whole real numbers 49 and lower.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat.

Methodology

FIG. 1 illustrates a flowchart depicting a method 100 of forming a trigger cell 200 to trigger or cause a thermal runaway in a battery cell 204, and operating the trigger cell 200, in accordance with an embodiment of the present disclosure. FIGS. 2A, 2B, 2C, 2D1, 2D2, 2E1, 2E2, 2F1, 2F2, 2G1, 2G2, 2H1, 2H2, and 2I collectively illustrate the trigger cell 200 in various stages of formation and operation in accordance with the methodology 100 of FIG. 1, in accordance with an embodiment of the present disclosure. FIGS. 1 and 2A-2I will be discussed in unison.

As described, the trigger cell 200 is to trigger thermal runaway in a battery cell, e.g., to test the battery cell during a thermal runaway event and/or to measure parameters associated with thermal runaway in the battery cell. For example, one challenge of battery technology (e.g., lithium-ion battery technology) is thermal management. An ongoing concern is the possibility of thermal runaway during use, handling, and/or transportation of batteries, such as lithium-ion batteries. Thermal runaway occurs when a series of self-sustaining exothermic side-reactions lead to total failure of the cell and, in some cases, fire and/or explosion. A battery cell undergoing a thermal runaway may emit hot gases, flames, and high-velocity jets of molten particulate matter, referred to as ejecta. Lithium-ion batteries have the potential to experience thermal runaway due to the chemical nature of the lithium-ion technology. For example, the materials and construction of individual battery cells or of the battery pack can result in a localized hot spot or heating that results in cell failure. Also, over-constraining a battery cell can result in large pressure gradients that lead to failure of mechanical components, such as plates and fasteners around a battery cell. Similarly, not letting the ejecta escape can lead to instantaneous formation of local hot spots that can trigger thermal runaway in nearby battery cells.

Therefore, the method 100 of FIG. 1 describes example processes for triggering a thermal runaway in a battery cell, e.g., in order to test thermal runaway handling capabilities of such battery cells. For example, as described herein below, the trigger cell 200 is built for testing the safety and robustness of thermal runaway of battery cells. The trigger cell 200 is a triggering mechanism for triggering thermal runaway in the battery cell, e.g., to test a temperature at which the thermal runaway occurs, to test whether the battery cell can withstand a certain temperature, and/or to test one or more other parameters associated with thermal runaway in the battery cell 204, in an example.

At 104 of the method 100, at least part of one or more side surfaces 207 of a battery cell 204 is wrapped with a first layer of dielectric material 212. In an example, the dielectric material 212 has relatively high thermal conductivity (e.g., compared to a thermal conductivity of a dielectric material 250 described below). In an example, a top surface 205 of the battery cell 204 comprises a cathode and a bottom surface 206 of the battery cell 204 comprises an anode of the battery cell 204, and the one or more side surfaces 207 extend from the top surface 205 to the bottom surface 206, e.g., as illustrated in FIG. 2A.

In the example of FIG. 2A, the battery cell 204 is cylindrical in shape. Thus, the battery cell 204 has a single side surface 207 extending between the top and bottom surfaces 205, 206. However, in other examples, the battery 204 can have another shape. For example, the top and bottom surfaces 205, 206 of the battery cell 204 may have a square shape, a rectangle shape, a triangle shape, or an oval shape. In some such examples, multiple side surfaces may extend between the top and bottom surfaces. More generally, the battery cell 204 may be of appropriate size, and may have any appropriate shape or form factor, which may be application specific.

In one embodiment, the battery cell 204 may be any appropriate type of battery cell. For example, the battery cell 204 may be a lithium ion battery cell, although the battery cell 204 may be of another appropriate type, such as a lead acid battery cell, or a hydrogen cell. In one embodiment, the battery cell 204 includes an electrolyte within a corresponding container, although the electrolyte is not illustrated in FIG. 2A. The battery cell may be contained within an enclosure, such as plastic enclosure or a metal enclosure. Such an enclosure may house or contain other componentry, in addition to the battery cell 204.

FIG. 2B illustrates an example of the first layer of the dielectric material 212 adjacent to the battery cell 204, and FIG. 2C illustrates the first layer of the dielectric material 212 wrapped around the side surface 207 to the battery cell 204. In an example, the dielectric material 212 is secured to the side surface 207 via an adhesive. In an example, the dielectric material 212 is an insulating tape or Polyimide film, such as a Kapton® tape. In some cases, the first layer of dielectric material 212 completely covers the side surface 207, while in other cases the first layer of dielectric material 212 may only partially cover the side surface 207 (e.g., substantially all of the major middle portion of side surface 207, but not the end portions near 205 and 206). In still other cases, the first layer of dielectric material 212 may cover the side surface 207 in a barber pole fashion, such that there are alternating covered portions and non-covered portions of side surface 207.

In an example, the thermal conductivity of the dielectric material 212 is at least 0.3 W/m-K (Watts per meter-Kelvin), or at least 0.4 W/m-K, at least 0.6 W/m-K, or at least 0.8 W/m-K, or at least 1 W/m-K. Thus, heat can be transferred through the first layer of dielectric material 212 to the battery cell under test, as will be described in turn.

In an example, the dielectric material 212 may be able to withstand high temperature, such as at least 300° C., or at least 400° C., or at least 500° C., or at least 600° C., for example, without substantially melting. The high temperature withstanding capability prevents, or at least reduces chances of the dielectric material 212 melting during the thermal runaway of the battery cell 204, in an example. Also, the dielectric material 212 will prevent shorting of the subsequently applied heating wire, as described below.

Note that the dielectric material 212 is not wrapped around the battery cell 204 during normal or regular operation of the battery cell 204 or otherwise part of the battery cell 204. Rather, the dielectric material 212 is wrapped around the battery cell 204 for purposes of forming the trigger cell 200, while testing the battery cell 204 for thermal runaway.

A number of benefits may be provided by dielectric material 212. For instance, the dielectric material 212 may form both a thermal pathway to the battery cell 204 and an electrical barrier layer between the battery cell 204 and the subsequently added heating wire 220, such that heat from the wire 220 may be transferred to the battery cell 204 effectively due to the relatively high thermal conductivity of the dielectric material 212, and loops of the wire 220 are not electrically shorted due to the electrical insulative property of the dielectric material 212. So, for instance, if any outer jacket or layers of the battery cell 204 melt during the testing, the first layer of dielectric material 212 may prevent that melted material from shorting portions of the subsequently applied heating wire, described with reference to FIG. 1 at 108.

The method 100 then proceeds from 104 to 108. At 108, a wire 220 is applied on and around the first layer of dielectric material 212, where the wire 220 meanders around the dielectric material 212, and at least in part wraps around the first layer of dielectric material 212. In an example, the leads or end sections of the wire 220 exit from near the bottom surface 206 of the battery cell 204 comprising the anode. In an example, the wire 220 is fixed on the first layer of dielectric material 212 using an adhesive or other suitable fastener.

FIG. 2D1 illustrates one example shape of a wire **220*a* wrapped around the dielectric material 212, and FIG. 2D2 illustrates another example shape of a wire 220*b* wrapped around the dielectric material 212. Referring to FIG. 2D1, the wire 220*a* has end sections or leads 221*a* and 222*a* exiting from near the bottom surface 206 comprising the negative or anode terminal of the battery cell 204. Thus, the end sections 221*a*, 222*a*** are nearer to the anode than the cathode of the battery cell.

During a faulty operation of a battery cell (such as during thermal runaway or for another reason), gases may be released by the battery cell, referred to herein as "outgassing" of the battery cell. For example, a pressure relief valve or membrane may be on or near a cathode or positive terminal of the battery cell 204, e.g., on or near the top surface of the battery cell 204, where the pressure relief valve or membrane may rapture during such an outgassing event, thereby releasing such gases. For example, during the thermal runaway triggered by the trigger cell 200, an outgassing event may occur. Because of the venting of such gases from or near the top surface of the battery cell 204, the end sections or leads **221*a* and 222*a* of the wire exit from or near the bottom surface 206 comprising the negative or anode terminal of the battery cell 204, as illustrated in FIG. 2D1, e.g., to avoid or reduce chances of the leads 221*a*, 222*a*** coming in contact with the outgases.

As further illustrated in FIG. 2D1, the wire **220*a* comprises a plurality of extension sections 216 and a plurality of loop sections 225. For example, an extension section 226 extends from near the bottom surface 206 (e.g., anode) of the battery cell 204 towards the top surface 205 (e.g., cathode) of the battery cell 204. Near the top surface 205, the wire 220*a* loops back or takes a turn at the lop section 225, and now extends from near the top surface 205 of the battery cell 204 towards the bottom surface 206 of the battery cell 204. Such extensions and loop-backs of the wire 220*a* continues, such that the wire 220*a* covers a large area of the dielectric material 212**.

In an example, at or near the loop section 225, a dielectric material adhesive tape 224 (e.g., which may be same as, or different from, the dielectric material 212) is used to attach ends of individual extension sections to the first layer of dielectric material 212. For example, FIG. 2D1 further illustrates a magnified view of a section of the wire **220*a*, and shows two such examples of the adhesive tape 224. The adhesive tape 224 holds the wire 220*a* in place, e.g., attaches the wire 220*a* to the dielectric material 212. In another example, other appropriate ways may be used to secure the wire 220*a* in place relative to the dielectric material 212**.

Referring now to the FIG. 2D2, illustrated is another example shape of a wire **220*b* wrapped around the dielectric material 212. Similar to that shown in FIG. 2D1, the wire 220*b* shown in FIG. 2D2 has end sections or leads 221*b* and 222*b* exiting from near the bottom surface 206 comprising the negative or anode terminal of the battery cell 204**. The above relevant description with respect to positioning of leads and outgassing is equally applicable here.

As further illustrated in FIG. 2D2, the wire **220*b* comprises a vertical spiral or spring shape, and is wrapped around the battery cell 204. For example, starting from the end section 221*b*, the wire 220*b* makes multiple loops around the battery cell 204, while traversing from near the bottom surface 206 towards the top surface 205 of the battery cell 204, as illustrated. Once the loops reach near the top surface 205 of the battery cell 204, a section 229 of the wire 220*b* extends from near the top surface 205 of the battery cell 204 to the end section 222*b* near the bottom surface 206 of the battery cell 204**.

In one embodiment, to avoid electrical shorting between the section 229 of the wire **220*b* and the loops of the wire 220*b*, the section 229 of the wire 220*b* and the loops of the wire 220*b* are separated by a dielectric material adhesive tape 228, such as a Polyimide film tape, e.g., a Kapton® tape. The tape 228 is illustrated to be semitransparent in FIG. 2D2, to show the loops of the wire 220*b* underneath the tape 228, although in practical implementation of the trigger cell 200, the tape 228** may not be semi-transparent, in an example.

In one embodiment, the wires **220*a* and/or 220*b* comprise relatively high resistivity conductive material, such that the wires 220*a* and/or 220*b* can generate sufficient heat when current is run through the wires 220*a* and/or 220*b*, or heat is otherwise applied to the wires 220*a* and/or 220*b*, so as to trigger the thermal runaway in the battery cell 204**. In an example, a nichrome wire may be used.

Nichrome comprises a family of alloys of, for example, nickel and chromium, and/or may also include iron. In some examples, nichrome may include one or more other elements as well. Nichrome is also referred to as NiCr, nickel-chromium or chromium-nickel. Nichrome may be used as a resistance wire in heating applications, e.g., used as heating elements. A nichrome alloy, for example, comprises 80% nickel and 20% chromium by mass, although other combinations of nickel and chromium (and/or one or more other metals) may also be possible. In an example, the wires 220*a* and/or 220*b* has an electrical resistivity of at least 80 μΩ-cm, or at least 100 μΩ-cm, or at least 110 μΩ-cm, for example. In an example, a 30 gauge nichrome wire may be used. In another example, fine copper wire and/or another appropriate wire that may be used as heating element may also be used.

FIGS. 2D1 and 2D2 illustrate two example layouts of the wire, although the wire 220 can have a number of other layouts suitable for imparting heat to the battery cell 204, e.g., as long as the wire 220 is at least in part wrapped around the dielectric material 212 and is able to heat up the battery cell 204. In another example, the wire 220 may be replaced by another appropriate heating arrangement. For example, a flexible printed circuit board (PCB) including heating elements can be used instead of the wire 220. For example, the flexible PCB can be wrapped around the dielectric material 212 and the battery cell 204. Conductive traces on the flexible PCB can act as heating element, to heat up the battery cell, in an example.

Referring again to FIG. 1, the method 100 then proceeds from 108 to 112. At 112, a temperature sensor 230 is attached to the trigger cell 200. In an example, the temperature sensor 230 exits from near the bottom surface 206 of the battery cell 204 comprising the anode, e.g., due to possibilities of outgassing event from the top surface 205 of the battery cell 204, as described above. In an example, a thermocouple (such as a 30 gauge thermocouple) is used as a temperature sensor, although any other appropriate type of temperature sensor may also be used.

For example, FIG. 2E1 illustrates an example location of the temperature sensor 230 for the wire 220*a*, and FIG. 2E2 illustrates an example location of the temperature sensor 230 for the wire 220*b*. In one example, the temperature sensor 230 may be located on the bottom surface 206 of the battery cell 204, as illustrated in the example of FIG. 2E2. Thus, the temperature sensor 230 may be in contact with one or more of the battery cell 204 (such as in FIG. 2E2), the dielectric material 212, and the dielectric material 250 (described below).

In an example, a dielectric material adhesive tape 231 may be affixed on the end sections 221, 222 of the wire and the end section of the thermocouple 230, e.g., to secure the end sections 221, 222 of the wire and the end of the thermocouple 230 (e.g., so that these do not substantially move relative to each other), to thereby reduce chances of accidental electrical shortage therebetween, as illustrated in FIGS. 2F1 and 2F2. The adhesive tape 231 may be any appropriate tape, such as a polyimide film tape, e.g., a Kapton® tape.

Referring again to FIG. 1, the method 100 proceeds from 112 to 116. At 116, at least a part of the one or more side surfaces of the battery cell 204 are wrapped using a second layer of dielectric material 250, such that the wire 220 is between the first layer of dielectric material 212 and the second layer of dielectric material 250. For example, FIG. 2G1 illustrates the second dielectric material 250 adjacent to the battery cell 204 comprising the wire 222*a*, and FIG. 2G2 illustrates the second dielectric material 250 wrapped around the battery cell 204 comprising the wire 222*a*. Similarly, FIG. 2H1 illustrates the second dielectric material 250 adjacent to the battery cell 204 comprising the wire 222*b*, and FIG. 2G2 illustrates the second dielectric material 250 wrapped around the battery cell 204 comprising the wire 222*b*.

The dielectric material 250 is illustrated to be semitransparent in FIGS. 2G2 and 2H2, to show the wires and thermocouple there below, although in practical implementation of the trigger cell 200, the dielectric material 250 may not be semi-transparent, in an example.

In an example, the dielectric material 250 has relatively low thermal conductivity. For example, the thermal conductivity of the dielectric material 250 is less than that of the dielectric material 212. The low thermal conductivity of the dielectric material 250 may ensure that a majority of the heat generated by the wires 220*a* and/or 220 remains trapped or is otherwise directed inward and transferred to the battery cell 204 through the relatively high thermally conductive first layer of dielectric material 212. Thus, the second layer of dielectric material 250 acts as a thermal barrier, to prevent or reduce heat from the wire 220 escaping the battery cell 204, as well as holding the wires 220 securely in place.

In an example, a pressure sensitive adhesive (PSA) backed dielectric material is used for the dielectric material 250, such that the dielectric material 250 can be easily wrapped around the battery cell 250. An example material is mica, such as PSA backed mica. For example, thermal conductivity of the dielectric material 250 (e.g., perpendicular to a plane of the dielectric material 250) may be at most 0.2 W/m-K, or at most 0.3 W/m-K, or at most 0.5 W/m-K, or at most 1 W/m-K, or at most 2 W/m-K, for example. For example, muscovite mica has a thermal conductivity (e.g., perpendicular to a plane of the mica sheet) of about 0.3 W/mK. As described above, for example, the thermal conductivity of the dielectric material 250 is less than that of the dielectric material 212.

In some cases, the second layer of dielectric material 250 completely covers the wire 220 and underlying first layer of dielectric 212, while in other cases the second layer of dielectric material 250 may only partially cover wire 220 and/or underlying first layer of dielectric 212. As described, one benefit of second layer of dielectric material 250 is to trap heat so as to induce thermal runaway in the battery cell under test, so full coverage is helpful to that end.

The resultant system 200 of FIGS. 2G2 and/or 2H2 are the trigger cells that may be used to test thermal runaway of the battery cell 204. Any of the trigger cells of FIG. 2G2 or 2H2 may be used, where the difference between these two trigger cells is the manner in which the wire 220 is wrapped around the battery cell 204. As described, two example manners of wrapping around the wire 220 around the battery cell 204 are illustrated in FIGS. 2A-2H2, but the wire 220 may be wrapped in another appropriate manner as well, in another example.

Thus, processes 104, 108, 112, and 116 of the method 100 describe formation of example trigger cells for triggering thermal runaway in the battery cell 204. Subsequent process 120 of the method 100 describes operation of a trigger cell.

Figure 2I:
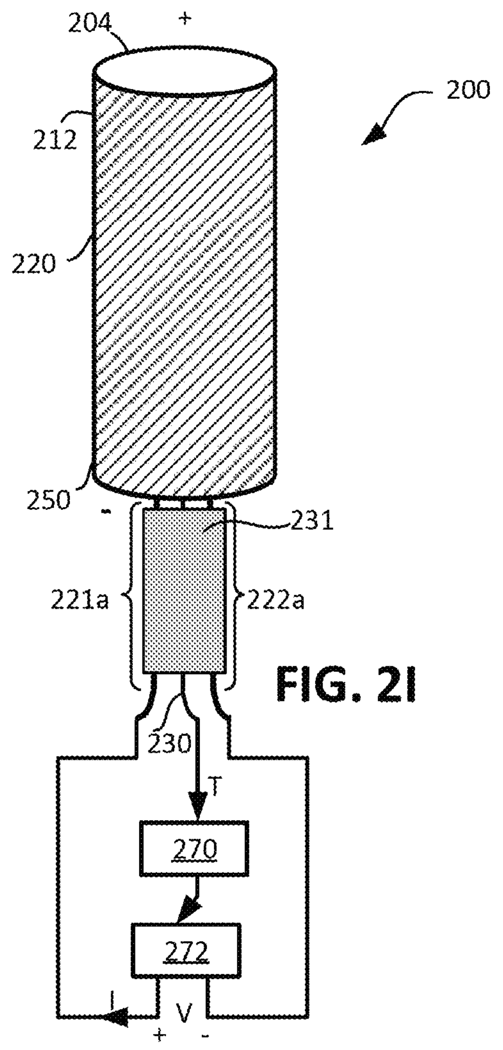

Referring again to FIG. 1, the method 100 proceeds from 116 to 120. At 120, a voltage V is applied across the wire 220 of the trigger cell 200 (e.g., by a power source 272) to generate a current I within the wire 220, and a controller 270 regulates the power delivered to the wire 220, e.g., based on a feedback of the temperature T measured by the temperature sensor attached to the battery cell 204, to trigger thermal runaway in the battery cell. FIG. 2I illustrates an example arrangement of the controller 270 and the power source 272. The power source 272 can control power supplied to the wire 220 of the trigger cell 200, e.g., by regulating the voltage V and/or the current I applied to the wire 220 of the trigger cell 200. The controller 270 receives the temperature T from the temperature sensor 230, and regulates the power source 272 based on the temperature T.

Although not illustrated, in an example, the controller 272 includes, or is coupled to, a communication chip, e.g., for communicating with the temperature sensor 230. In one embodiment, the controller 270 includes a microprocessor coupled to a computer readable storage medium, such as a memory or a data storage device. In one embodiment, the computer-readable storage medium stores instructions or codes, which, when executed by the microprocessor, cause the microprocessor to perform operations to regulate the power supply 270, based on the temperature T, as described herein. In another example, the controller 270 may be implemented using appropriate hardware circuitry.

In an example, the process 120 to trigger the thermal runaway is performed when the battery cell 204 is non-operational. In another example, the process 120 to trigger the thermal runaway is performed when the battery cell 204 is operational, e.g., supplying power to a load. In an example, if the battery cell 204 is supplying power to a load and the process 120 is performed, the operation of the battery cell 204 may contribute to some additional heating from losses inside the battery cell, in addition to the heating by the wire 220. In yet another example, the battery cell 204 may be undergoing a charging process, e.g., when the process 120 to trigger the thermal runaway is performed. In a further example, a state of charge of the battery cell 120 may range anywhere from 0% to 100%, when the process 120 to trigger the thermal runaway is performed. Thus, the process 120 to trigger the thermal runaway may be performed at any operating, non-operating, and/or charging state of the battery cell 204, in an example.

Figure 3A:
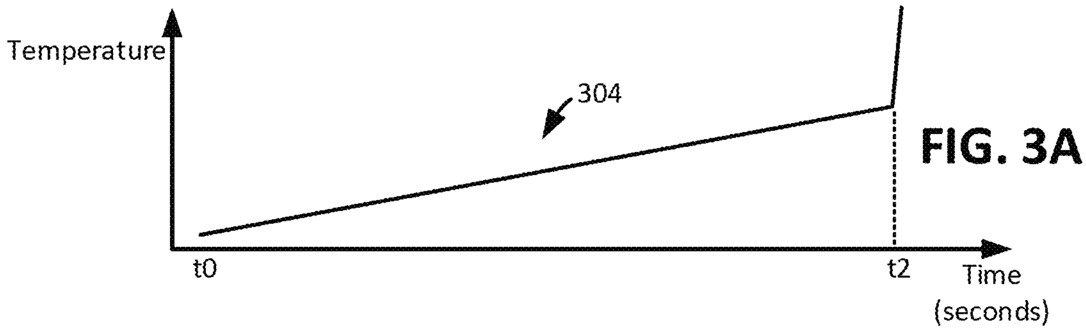
FIG. 3A illustrates a graph depicting variation in temperature over time, when operating the trigger cell of FIG. 21, in accordance with an embodiment of the present disclosure.
Figure 3B:
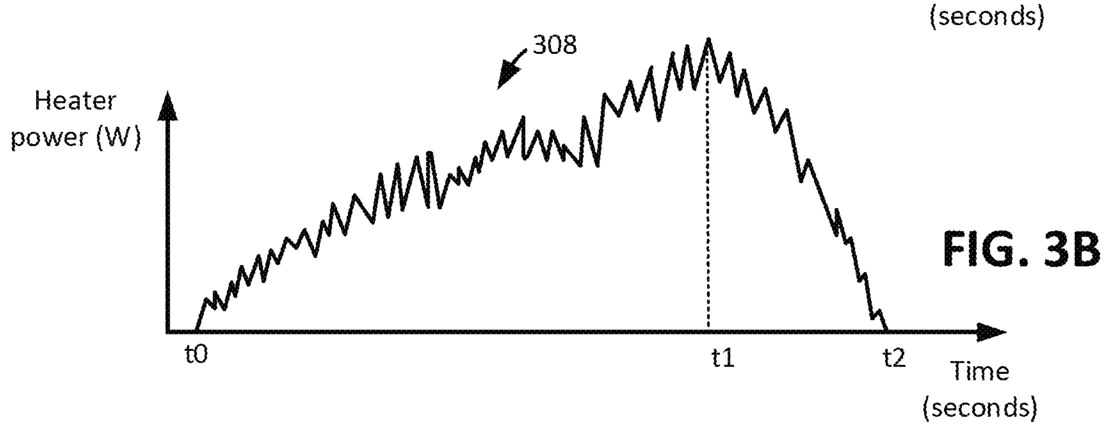
FIG. 3B illustrates a graph depicting variation in power supplied to a heating wire of the trigger cell of FIG. 2I during operation of the trigger cell, in accordance with an embodiment of the present disclosure.

FIG. 3A illustrates a graph 304 depicting variation in temperature over time, when operating the trigger cell 200 of FIG. 21, in accordance with an embodiment of the present disclosure. FIG. 3B illustrates a graph 308 depicting variation in power supplied to a heating wire 220 of the trigger cell 200 of FIG. 2I during operation of the trigger cell 200, in accordance with an embodiment of the present disclosure.

Referring to the graphs 304 and 308, prior to time to, no power is applied to the wire 220 of the trigger cell 200, and the temperature T is ambient temperature. From time to, power is applied to the wire 220 of the trigger cell 200, resulting in an increase in the temperature T. For example, as the wire 220 is a heating element having relatively high resistivity, the temperature of the wire 220 rises with power supplied to the wire 220.

As illustrated in the graphs 304 and 308, the controller 270 aims to ensure a relatively smooth rise in the temperature T of the battery cell 204 (e.g., constant or near constant temperature slope), and accordingly, regulates the power delivered to the wire 200. Accordingly, the power delivered graph 308 is not smooth and has peaks and valleys. The controller 270 aims to maintain the constant or substantially constant rise in temperature T, e.g., to mimic real life battery cell thermal runaway conditions, e.g., where temperature may rise in a constant or substantially constant slope.

Till time t1 (see graph 308), the average power increases, where the power supplied to the wire 220 heats up the wire 220, which in turn causes temperature within the battery cell 204 to rise. From time t1, the controller 270 starts decreasing the average power, e.g., because from time t1 onwards, the battery cell 204 starts a self-heating process, which indicates a start of thermal runaway condition. The self-heating continues till time t2, and the power is gradually decreased from time t1 to time t2. At time t2, the thermal runaway within the battery cell 204 has occurred, which is indicated by a sudden increase in the temperature T.

Note that the processes in method 100 of FIG. 1 are shown in a particular order for ease of description. However, one or more of the processes may be performed in a different order or may not be performed at all (and thus be optional), in accordance with some embodiments. Numerous variations on method 100 and the techniques described herein will be apparent in light of this disclosure.

Further Example Embodiments

The following examples pertain to further embodiments, from which numerous permutations and configurations will be apparent.

Example 1. A system for testing thermal runaway in a battery cell, comprising: a first layer of first dielectric material wrapped, at least in part, around the battery cell; a wire comprising one or more metals wrapped, at least in part, around the first layer of first dielectric material; a second layer of second dielectric material at least in part wrapped around the wire; and a power source configured to supply power to the wire.

Example 2. The system of example 1, further comprising: a temperature sensor in contact with the first layer, the second layer, and/or the battery cell.

Example 3. The system of example 2, further comprising: a controller configured to receive a temperature reading from the temperature sensor, and control a power supplied by the power source to the wire, based at least in part on the temperature reading.

Example 4. The system of example 3, wherein the controller is configured to control the power supplied by the power source to the wire, wherein the power supplied to the wire generates heat and wherein the controller controls the power supply such that the temperature reading from the temperature sensor maintains a substantially constant rate of change.

Example 5. The system of any one of examples 3-4, wherein the controller is configured to cause the power source to cease supplying power or reduce the amount of power supplied to the wire, in response to the thermal runaway being triggered in the battery cell.

Example 6. The system of any one of examples 1-5, wherein the power source is configured to supply the power to the wire, to heat the wire and cause a thermal runaway in the battery cell.

Example 7. The system of any one of examples 1-6, wherein the wire comprises: a first extension section that extends from near an anode of the battery cell to near a cathode of the battery cell; a second extension section that extends from near the cathode of the battery cell to near the anode of the battery cell; and a loop back section that couples the first extension section and the second extension section.

Example 8. The system of any one of examples 1-7, wherein the wire has a first end section and a second end section that are nearer to the anode of the battery cell and further from the cathode of the battery cell.

Example 9. The system of any one of examples 1-8, wherein: the wire is arranged in a vertical spiral manner around the battery cell; the vertical spiral has a first end near the anode of the battery cell, and a second end near the cathode of the battery cell; a first end section of the wire couples the first end of the vertical spiral to the power source, such that the first end section of the wire is nearer to the anode than the cathode; a second end section of the wire couples the second end of the vertical spiral to the power source; and the second end section of the wire is arranged at least in part above the vertical spiral and is separated from the vertical spiral by a third layer of dielectric material.

Example 10. The system of any one of examples 1-9, wherein the wire is a nichrome wire comprising nickel and chromium.

Example 11. The system of any one of examples 1-10, wherein the second layer of second dielectric material has a lower thermal conductivity than the first layer of first dielectric material.

Example 12. The system of any one of examples 1-11, wherein the first layer of first dielectric material comprises a polyimide film, and the second layer of second dielectric material comprises mica.

Example 13. A method of forming and operating a thermal runaway trigger cell for a battery cell, the method comprising: wrapping a first layer of first dielectric material at least in part around a surface of the battery cell, the surface extending from a cathode to an anode of the battery cell; wrapping a wire at least in part around the first layer of first dielectric material; wrapping a second layer of second dielectric material at least in part around the wire; and coupling the wire to a power source.

Example 14. The method of example 13, further comprising: arranging a temperature sensor in contact with at least one of the first layer, the second layer, and the battery cell.

Example 15. The method of any one of examples 13-14, further comprising: supplying power from the power source to the wire, to heat the wire and cause a thermal runaway in the battery cell.

Example 16. The method of any one of examples 13-15, further comprising: arranging a temperature sensor in contact with at least one of the first layer, the second layer, and the battery cell; supplying power from the power source to the wire, to heat the wire and cause a thermal runaway in the battery cell; and regulating the power from the power source to the wire, based at least in part on an output of the temperature sensor.

Example 17. The method of example 16, wherein regulating the power from the power source to the wire comprises: regulating the power from the power source to the wire such that one or both of (i) at least a part of a rise in the temperature has a constant or near constant slope, and (ii) the power supply is reduced or removed, in response to achieving a thermal runaway in the battery cell.

Example 18. A system for testing a battery cell, comprising: a wire comprising one or more metals at least in part wrapped around a battery cell; an electrical barrier layer between the wire and the battery cell; and a thermal barrier layer on the wire.

Example 19. The system of example 18, further comprising: a thermocouple to measure a rise in temperature of the battery cell.

Example 20. The system of example 19, further comprising: a power supply to supply power to the wire; and a controller to regulate the power supplied to the wire, based at least in part on a temperature reading from the thermocouple.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A system for testing thermal runaway in a battery cell, comprising:

a first layer of first dielectric material wrapped, at least in part, around the battery cell;

a wire comprising one or more metals wrapped, at least in part, around the first layer of first dielectric material, wherein the wire is arranged in a vertical spiral manner around the battery cell, the vertical spiral has a first end near an anode of the battery cell, and a second end near a cathode of the battery cell, the wire has a first end section and a second end section that are nearer to the anode of the battery cell and further from the cathode of the battery cell, and the second end section of the wire is arranged at least in part above the vertical spiral and is separated from the vertical spiral by a third layer of dielectric material;

a second layer of second dielectric material at least in part wrapped around the wire;

a power source configured to supply power to the wire; and a temperature sensor in contact with the first layer, the second layer, and/or the battery cell.

2. The system of claim 1, further comprising:

a controller configured to receive a temperature reading from the temperature sensor, and control a power supplied by the power source to the wire, based at least in part on the temperature reading.

3. The system of claim 2, wherein the controller is configured to control the power supplied by the power source to the wire, wherein the power supplied to the wire generates heat and wherein the controller controls the power supply such that the temperature reading from the temperature sensor maintains a substantially constant rate of change.

4. The system of claim 2, wherein the controller is configured to cause the power source to cease supplying power or reduce the amount of power supplied to the wire, in response to the thermal runaway being triggered in the battery cell.

5. The system of claim 1, wherein the power source is configured to supply the power to the wire, to heat the wire and cause a thermal runaway in the battery cell.

6. The system of claim 1, wherein the wire comprises:

a first extension section that extends from near the anode of the battery cell to near the cathode of the battery cell;

a second extension section that extends from near the cathode of the battery cell to near the anode of the battery cell; and a loop back section that couples the first extension section and the second extension section.

7. The system of claim 1, wherein the first end section of the wire and the second end section of the wire exit from a bottom surface of the battery cell comprising the anode.

8. The system of claim 1, wherein:

the first end section of the wire couples the first end of the vertical spiral to the power source, such that the first end section of the wire is nearer to the anode than the cathode; and the second end section of the wire couples the second end of the vertical spiral to the power source.

9. The system of claim 1, wherein the wire is a nichrome wire comprising nickel and chromium.

10. The system of claim 1, wherein the second layer of second dielectric material has a lower thermal conductivity than the first layer of first dielectric material.

11. The system of claim 1, wherein the first layer of first dielectric material comprises a polyimide film, and the second layer of second dielectric material comprises mica.

12. A method of forming and operating a thermal runaway trigger cell for a battery cell, the method comprising:

wrapping a first layer of first dielectric material at least in part around a surface of the battery cell, the surface extending from a cathode to an anode of the battery cell;

wrapping a wire at least in part around the first layer of first dielectric material, wherein the wire is arranged in a vertical spiral manner around the battery cell, the vertical spiral has a first end near the anode of the battery cell, and a second end near the cathode of the battery cell, the wire has a first end section and a second end section that are nearer to the anode of the battery cell and further from the cathode of the battery cell, and the second end section of the wire is arranged at least in part above the vertical spiral and is separated from the vertical spiral by a third layer of dielectric material;

wrapping a second layer of second dielectric material at least in part around the wire;

coupling the wire to a power source; and arranging a temperature sensor in contact with at least one of the first layer, the second layer, and the battery cell.

13. The method of claim 12, further comprising:

supplying power from the power source to the wire, to heat the wire and cause a thermal runaway in the battery cell.

14. The method of claim 12, further comprising:

arranging a temperature sensor in contact with at least one of the first layer, the second layer, and the battery cell;

supplying power from the power source to the wire, to heat the wire and cause a thermal runaway in the battery cell; and regulating the power from the power source to the wire, based at least in part on an output of the temperature sensor.

15. The method of claim 14, wherein regulating the power from the power source to the wire comprises:

regulating the power from the power source to the wire such that one or both of (i) at least a part of a rise in the temperature has a constant or near constant slope, and (ii) the power supply is reduced or removed, in response to achieving a thermal runaway in the battery cell.

16. A system for testing a battery cell, comprising:

a wire comprising one or more metals at least in part wrapped around a battery cell, wherein the wire is arranged in a vertical spiral manner around the battery cell, the vertical spiral has a first end near an anode of the battery cell and a second end near a cathode of the battery cell, the wire has a first end section and a second end section that are nearer to the anode of the battery cell and further from the cathode of the battery cell, and the second end section of the wire is arranged at least in part above the vertical spiral and is separated from the vertical spiral by a dielectric material adhesive tape;

an electrical barrier layer between the wire and the battery cell;

a thermal barrier layer on the wire; and a thermocouple to measure a rise in temperature of the battery cell.

17. The system of claim 16, further comprising:

a power supply to supply power to the wire; and a controller to regulate the power supplied to the wire, based at least in part on a temperature reading from the thermocouple.

* * * * *